United States Patent [19]

Drake

[11] Patent Number: 4,595,067
[45] Date of Patent: Jun. 17, 1986

[54] ROTARY DRILL BIT, PARTS THEREFOR, AND METHOD OF MANUFACTURING THEREOF

[75] Inventor: Eric F. Drake, Pearland, Tex.
[73] Assignee: Reed Tool Company, Houston, Tex.
[21] Appl. No.: 571,410
[22] Filed: Jan. 17, 1984
[51] Int. Cl.⁴ ............ E21B 10/46; E21B 10/50; E21B 10/52
[52] U.S. Cl. .................. 175/331; 175/411; 175/374
[58] Field of Search ............ 175/331, 411, 375, 374, 175/410, 409; 403/270-271, 266, 267; 76/108 R, 108 A, DIG. 11, 101 A, 101 R; 228/112, 263.14

[56] References Cited

U.S. PATENT DOCUMENTS

| | | |
|---|---|---|
| 2,687,875 | 3/1951 | Morlan et al. |
| 3,599,737 | 8/1971 | Fischer .......................... 175/374 |
| 4,078,713 | 3/1978 | Marshall ..................... 228/263.14 |
| 4,105,263 | 8/1978 | Sorensen et al. ................. 308/8.2 |
| 4,168,923 | 9/1979 | Vezirian ......................... 403/267 |
| 4,190,127 | 2/1980 | Wolf ............................ 76/101 R |
| 4,339,009 | 7/1982 | Busby ............................ 175/374 |
| 4,372,404 | 2/1983 | Drake ............................ 175/374 |
| 4,381,825 | 5/1983 | Padtke ........................... 175/393 |
| 4,453,605 | 6/1984 | Short, Jr. .................... 76/DIG. 11 |
| 4,484,644 | 11/1984 | Cook et al. .................... 175/409 |
| 4,520,881 | 6/1985 | Phaal ............................ 175/410 |

*Primary Examiner*—Stephen J. Novosad
*Assistant Examiner*—Bruce M. Kisliuk
*Attorney, Agent, or Firm*—Carl A. Rowold

[57] ABSTRACT

A roller cutter for a rotary drill bit comprising a conical roller cutter body of metal, and a plurality of cutting elements secured to the outer surface of the roller cutter body primarily by welding and being substantially free of mechanical interconnection to the roller cutter body. Each cutting element is an elongate member having a base portion at one end thereof engageable with the roller cutter body and a tip portion at the other end thereof engageable with the formation to be drilled for drilling the formation. The element is formed of a material at its tip portion which has relatively high compressive strength and good wear resistance properties, but which also has a coefficient of thermal expansion and elastic moduli significantly different from those of the metal of the cutter body thereby rendering it incapable of being satisfactorily welded thereto, and being formed of a material at its base portion which has a coefficient of expansion and elastic moduli similar to those of the metal of the cutter body thereby enabling it to be welded thereto. The cutting elements are formed of a composite material having first and second phases, with the volume fractions of these phases varying in a generally continuous composition gradient along the length thereof. In addition, a drag type drill bit, and a method of manufacturing the roller cutter and the drag bit are disclosed.

10 Claims, 7 Drawing Figures

ROTARY DRILL BIT, PARTS THEREFOR, AND METHOD OF MANUFACTURING THEREOF

BACKGROUND OF THE INVENTION

This invention relates to rotary drill bits used to drill well bores in the earth for oil and gas production, and more particularly to such bits having at least one steel member and a plurality of cutting elements or inserts of hard metal secured in bores in the steel member in an interference press fit.

This invention involves an improvement over roller cutter drill bits of the "insert" type, such as shown for example in U.S. Pat. Nos. 2,687,875 and 4,105,263. These bits comprise a bit body having a threaded pin at its upper end adapted to be detachably secured to a drill string for rotating the drill bit and delivering drilling fluid under pressure to the drill bit, and a plurality of depending legs (typically three legs) at its lower end, each having a generally inwardly extending bearing journal. A roller cutter is rotatably mounted on each of the bearing journals. Each roller cutter comprises a generally conical roller cutter body having a recess in the base thereof for receiving the bearing journal and a plurality of cutting elements mounted on the conical surface of the body and engageable with the formation to be drilled. The roller cutter bodies are typically machined from a forged steel blank. The cutting elements are typically elongate members of sintered tungsten carbide and are secured to the roller cutter body by pressing the inserts in an interference fit into blind end bores or holes drilled in the roller cutter body. While drill bits of the above-described insert type have been generally satisfactory as evidenced by the fact that such bits have been a standard commerically available product in the drill bit manufacturing industry for over thirty years, it nonetheless suffers from several significant problems.

As best illustrated in FIG. 2 of U.S. Pat. No. 4,105,263, the blind end holes in the roller cutter body reduces the body's strength in compression thereby requiring that the roller cutter body be made thicker than otherwise required so as to withstand the downward loads (which may exceed 60,000 pounds) applied to the drill bit during drilling. Because the outer dimensions of a roller cutter body are limited by the size of the well bore to be drilled and the need for the roller cutter body to mesh with the other two cutter bodies of the bit, an increase in roller cutter thickness can be achieved only by a correspondence reduction in bearing journal size. The latter reduces the load carrying capability of the bearing journal which also must carry the downward load applied to the bit. Failure of one of the bearing assemblies (i.e., the journal, the roller cutter and any intermediate bearing means) of a drill bit, is one of the most common causes of bit failure and thus a limiting factor in the useful life of many bits. Moreover, bearing assembly failure can be more serious than other modes of bit failure, such as insert wear, in that it may result in a roller cutter body being left at the well bore bottom when the bit is pulled from the well bore for replacement. This roller cutter body must be removed by a time-consuming and hence costly "fishing" operation, before drilling can be resumed.

Another problem, which arises during manufacture of the roller cutter, is providing the proper interference fit of the inserts in the blind end holes in the cutter body. If the fit is too loose, the inserts will not be retained during drilling. Conversely, if the fit is too tight, high forces are generated in the roller cutter body when the inserts are pressed into the roller cutter body, and portions of the roller cutter body between adjacent inserts may fracture and be broken from the body during drilling. Accordingly, the dimensional tolerance of the blind end bores and inserts must be held within close limits.

Moreover, securing the inserts to the roller cutter body by an interference press fit, limits the number of materials of construction which may be used for the roller cutter body to those which will provide adequate core strength for the roller cutter body. In addition, it limits the closeness of the spacing between adjacent inserts and the diameter and hence the protrusion length of the tungsten carbide inserts, which have relatively low strength in bending.

As disclosed in U.S. Pat. Nos. 3,599,737 and 4,168,923, attempts have been made to provide additional means for retaining the inserts in the blind end holes to supplement the holding power of the interference press fit, thereby enabling certain of the above-described problems to be overcome to some extent. However, the additional retaining means have not proven entirely satisfactory and have not found wide commercial acceptance. In particular, the welding technique disclosed in U.S. Pat. No. 4,168,923 proved difficult to perform in practice, because the difference in thermal expansion between the tungsten carbide inserts and the steel roller cutter bodies and the brittle phases produced in the weld resulted in cracking of many of the welds upon cooling and because the disparity in elastic moduli across the weld resulted in cracking of other welds during use of the bit.

As shown in U.S. Pat. No. 4,381,825, the securing of cutting elements to a drill bit body by means of an interference press fit is also utilized in certain drag type drill bits. Such drill bits comprise a lower bit body portion or cutter head of steel having a plurality of blind end bores therein, and cutting elements, such as those commercially available under the trade designation "STRATA-PAX" from the General Electric Company of Worthington, Ohio, pressed into the bores. Each cutting element comprises a layer of synthetic diamond deposited on a disc of tungsten carbide to form a so-called compact, and an elongate member or stud of tungsten carbide to which the compact is brazed. Drill bits of this type suffer from many of the same problems as those described above for the insert type roller cutter drill bits.

SUMMARY OF THE INVENTION

Among the several objects of this invention may be noted the provision of an improved roller cutter for a rotary drill bit having a metal roller cutter body and cutting elements of hard material welded directly to the surface of the roller cutter body without a substantial mechanical interconnection therebetween; the provision of such a roller cutter enabling its bearing assembly to be made larger for carrying a greater load than the conventional insert type roller cutter; the provision of such a roller cutter which may be manufactured in fewer and less costly manufacturing steps than the conventional insert type roller cutter, yet with greater precision and more reliability; the provision of such a roller cutter which enables its roller cutter to be manufactured from a greater range of materials than conventional insert type roller cutters; the provision of such a roller cutter which may be manufactured with closer spacing between adjacent cutting elements and with greater cutting element protrusion than that for conventional insert type roller cutters; the provision of such a roller cutter having cutting elements having both a base portion of a material which may be welded to the steel roller cutter body and a tip portion of a hard, wear resistant material; the provision of a dray type bit having cutting elements welded to its lower or cutting face; and the method of manufacturing a drill bit and a roller cutter by friction welding cutting elements to a metal bit member.

In general, the roller cutter of this invention comprises a generally conical roller cutter body formed of metal, and a plurality of cutting elements secured to the outer surface of the roller cutter body primarily by welding and being substantially free of mechanical interconnection to the roller cutter body. Each cutting element is an elongate member having a base portion at one end thereof engageable with the roller cutter body and a tip portion of its other end engageable with the formation to be drilled. The cutting element is formed of a material at its tip portion which has relatively high compressive strength and good wear resistance properties but which also has a coefficient of thermal expansion and elastic moduli significantly different from those of the metal of the roller cutter body thereby rendering it incapable of being satisfactorily welded to the roller cutter body. It is further formed of a material at its base portion which has a coefficient of thermal expansion and elastic moduli similar to those of the metal of the roller cutter body thereby enabling it to be welded to the roller cutter body.

More particularly, the cutting element is of one-piece construction and comprises a composite material consisting of at least a first and a second phase, with the composite material at the tip portion having a greater volume fraction of said first phase than of said second phase and the composite material at the base portion having a greater volume fraction of said second phase than of said first phase. The relative volume fractions of the first and second phases vary in a generally continuous gradient along the length of the cutting element.

The drag type rotary drill bit of this invention comprises a body member formed of metal at the lower end of the drill bit, a plurality of cutting elements of the above-described composite material secured to the body member primarily by thermal bonding, such as welding, and being substantially free of mechanical interconnection to the body member.

The method of this invention comprises the steps of providing a steel drill bit member constituting a lower end portion of the drill bit and a plurality of elongate cutting elements formed at least in part of metal, each having a base portion at one end thereof and a tip portion at its other end. One of the cutting elements is positioned in engagement with the metal member, rotated relative to the metal member, and pressed by an axial force against the metal member while undergoing relative rotation to develop frictional force and heating at the engaging surfaces of the cutting element and the metal member. Rotation of the cutting element relative to the metal member under the axial force is continued until the temperature of their engaging surfaces reaches a predetermined temperature at which bonding may be effected. Thereafter, the relative rotation is terminated and the cutting element and metal member are allowed to cool while axial force is still applied to effect bonding of the cutting element to the metal member. These method steps are repeated for the remaining cutting elements.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIEMENTS

Figure 1:
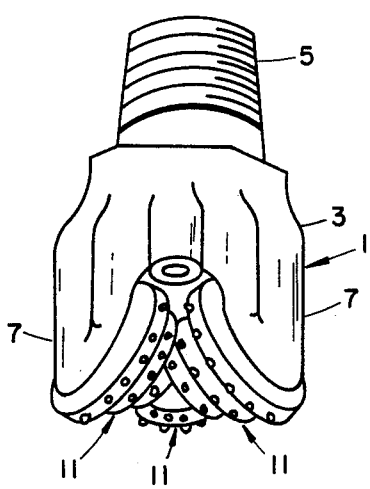
FIG. 1 is a perspective of a rotary drill bit having roller cutters of this invention.
Figure 3:
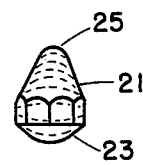
FIG. 3 is an enlarged elevation of one of the cutting elements, the dotted lines representing schematically the composition gradient of the cutting element along its length.

Referring to FIG. 1, there is generally indicated at 1 a tri-cone roller cutter drill bit used to drill well bores in formations in the earth for oil and gas production. The drill bit comprises a bit body 3 having a threaded pin 5 at its upper end for detachably securing the drill bit to a drill string (not shown) for rotating the drill bit and delivering drilling fluid under pressure to the drill bit. The bit body further has three depending legs 7 at its lower end (two of which are shown in FIG. 1), each having a generally cylindrical bearing journal 9 extending inwardly toward the vertical centerline of the bit body. A roller cutter 11 of this invention is rotatably mounted on each of the bearing journals by conventional bearing means, generally indicated at 13, having a bushing and ball bearings.

Figure 2:
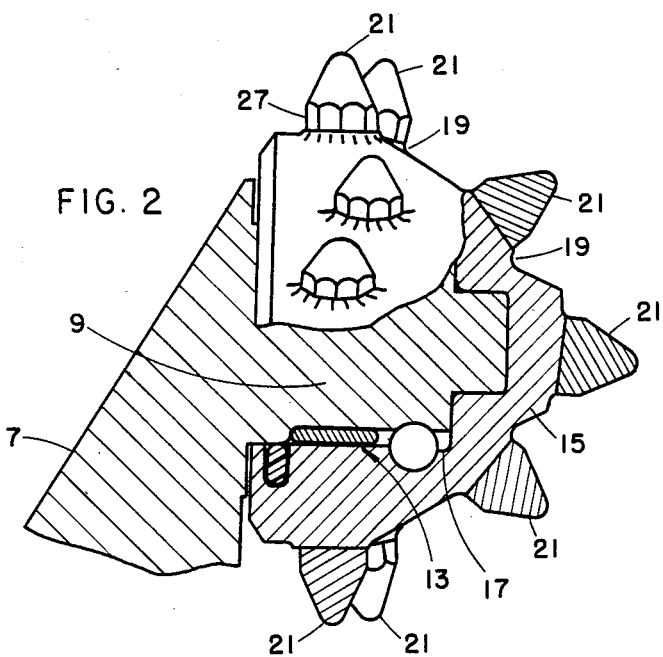
FIG. 2 is an enlarged partial section of one roller cutter as rotatably mounted on a bearing journal, showing the roller cutter and journal in inverted position and cutting elements of the roller cutter secured to the roller cutter body.

As best illustrated in FIG. 2, the roller cutter 11 comprises a generally conical roller cutter body 15 formed by machining a forged blank of suitable metal such as an alloy steel, for example, ASTM 4820 or Ex55. The roller cutter body has a recess 17 of generally circular section in its base receiving the respective bearing journal. If further has a plurality of raised lands 19 on its otherwise frustoconical outer surface arranged at spaced intervals around the roller cutter body in annular rows or rings.

Figure 4:
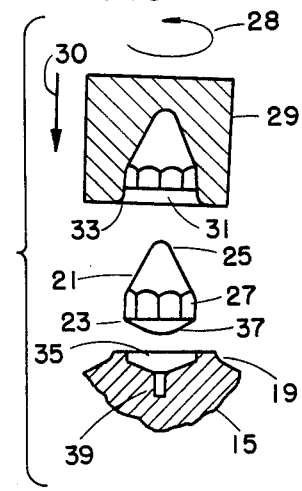
FIG. 4 is an exploded partial section of the roller cutter body, a cutting element to be friction welded to the body and a fixture for holding the cutting element during the welding operation.

The roller cutter 11 further comprises a plurality of cutting elements 21 mounted on the lands 19 on the roller cutter body. Each cutting element 21 is a generally elongate member of one-piece construction. It has a base portion 23 at one end thereof engageable with the roller cutter body and a tip portion 25 at its other end engageable with the formation at the well bore bottom to be drilled for drilling the formation. As shown in FIG. 2, the tip portion of the cutting element is generally conical, while the base portion has a series of generally flat faces 27 therearound enabling the cutting element to be held by a fixture, such as fixture 29 in FIG. 4, for rotation, as described more fully hereinafter.

Figure 5:
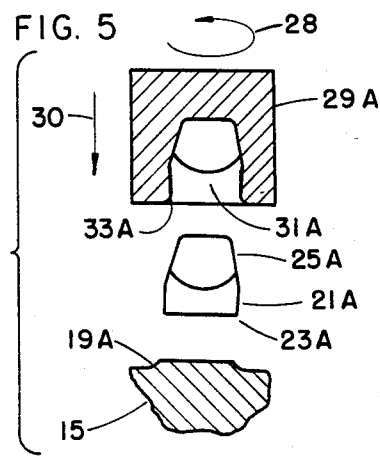
FIG. 5 is a view similar to FIG. 4 showing a cutting element of a different configuration than that of FIG. 4.

As shown in FIG. 5, in an alternative construction, the cutting element 21A may be formed to have a chisel shaped tip portion 25 and a generally cylindrical base portion 23A. It is further contemplated that the cutting element may also be of other configurations such as spherical or ogive at its tip portion (not shown). In addition, it is contemplated that the cutting elements may be of circular section throughout the length thereof and held via collet-type fixture for rotation.

The cutting elements 21 are preferably formed of a powder metallurgy composite material such as that described in my U.S. Pat. No. 4,372,404, issued Feb. 8, 1983. This material comprises a first and second phase. The first phase is a suitable refractory compound, such as a metal carbide (e.g., tungsten carbide). This phase is referred to as powder A in my U.S. Patent. The second phase comprises a binder metal such as an alloy of iron, cobalt, nickel or copper, and is referred to in my U.S. Patent as powders B and C. As described in detail in my U.S. Patent, the cutting element is formed by molding and sintering operations in which material having the first and second phases are delivered to the mold in a predetermined metered manner such that the cutting element has a continuous composition gradient of the phases generally for the length thereof. The material first delivered to the mold and corresponding to the tip portion 25 of the cutting element 21 has a greater volume of the first phase than the second phase. Thus the composite material at the tip postion 25 is rich in tungsten carbide, which has relatively high compressive strength and good wear resistance properties and is thus generally accepted in the drill bit manufacturing industry as being the preferred material for use at the formation engaging surface of a cutting element. However, tungsten carbide also has a coefficient of thermal expansion and elastic moduli significantly different from those of steel, thereby rendering tungsten carbide members incapable of being satisfactorily thermally bonded to a steel member. Accordingly, heretofore tungsten carbide cutting elements have been secured to steel roller cutters primarily by a mechanical interconnection therebetween; namely positioning the cutting elements in a blind end holes in the roller cutter body in an interference press fit. Conversely, the composite material last delivered to the mold and corresponding to the base postion of the cutting element has a greater volume fraction of the second phase than the first. This composite material has a coefficient of expansion and elastic moduli similar to those of the steel of the roller cutter body and is otherwise compatible with steel for purposes of thermal bonding; e.g., welding to steel. Intermediate the tip and base portions of the cutting element, the first and second phases are delivered to the mold in such manner that the cutting element has a generally continuous composition and property gradient substantially along its length. This unique construction of applicant's cutting elements, enables for the first time cutting elements comprising tungsten carbide to be secured to a steel roller cutter body primarily by thermal bonding, and being free of any substantial mechanical interconnection therebetween.

The preferred method of thermal bonding the cutting elements to the roller cutter body involves friction welding techniques. More particularly, in the preferred method, one of the cutting elements 21 is positioned with its base portion 23 in engagement with one of the lands 19 on the roller cutter body. This is done by means of a fixture such as those shown at 29 and 29A in FIGS. 4 and 5 having a recess 31, 31A therein having a configuration corresponding to that of the cutting element. This fixture is held in the driven chuck of a conventional friction welding machine (not shown), such as those described in U.S. Pat. Nos. 3,269,002 and 3,452,422. The roller cutter body 15 is held in the stationary chuck of the machine. With the cutting element 21 positioned in engagement with roller cutter body 15, the cutting element is rotated relative to the roller cutter body (as represented by the arrow 28) and axial force (as represented by the arrow 30) is applied to the cutting element to press it against the roller cutter body to develop frictional force and heating at the engaging surfaces of the cutting element and the roller cutter body. This rotation and application of axial force is continued until the temperature of the engaging surfaces reaches a predetermined level at which bonding may be effected. Thereafter, the relative rotation is terminated and the cutting element and the roller cutter body allowed to cool. At the same time, axial force is continued to be applied to effect the bonding of the cutting element to the roller cutter body. To manufacturer the complete roller cutter 11, cutting elements are friction welded to all of the lands on the roller cutter body by repeating the above-described steps.

Depending on the particular materials of the cutting elements and the roller cutter body, it may be desirable to apply an axial force against the cutting element of greater magnitude after termination of rotation than during rotation. Moreover, because weld flash tends to form at the periphery of the cutting element at its engaging surface during the welding operation, it may be desirable to incorporate means such as a cutting edge 33, 33A on the fixture for removing flash. Thus, as a part of the method of welding the cutting element on the roller cutter body, weld flash would be removed. In addition, the cutting edge 33, 33A of the fixture may be used to machine the land 19, 19A on which the cutting element is welded, so that the sides of the cutting element and the land are generally flush.

As illustrated in FIG. 5, the engaging surfaces of the cutting element 21A and the land 19A to which it is to be welded may be generally planar. However, other configurations of these surfaces also may be used to produce satisfactory weldments. For example, the land may be provided with a shallow recess 35 and the base postion of the cutting element with a corresponding projection 37, so as to position the bond line out of the plane of the change of cross section of the cutting element and the land, which is the plane of highest stress. To minimize the amount of metal removed from the roller cutter body, the depth of the recess 35 should correspond generally to the height of the land 19. In addition, a short, small diameter bore, shown at 39 in FIG. 4, may be provided at the center of the recess 35 to serve as a "flash trap."

The critical factors in the welding operation are the speed of rotation of the cutting element, the axial pressure applied during rotation and after termination of rotation and the periods of time during which rotation and axial force are applied, all of which can be controlled relatively accurately. Satisfactory friction welded bonds between cutting elements 21 formed of graded tungsten carbide with a cobalt binder and a low alloy steel member have been effected in the development of this invention by preheating the steel member to 375° F., rotating the cutting element when in engagement with the steel member at 2150 RPM for 2 to 25 seconds while applying axial pressure of 5,000 to 30,000 psi against the cutting element, and applying axial pressure of 7,500 to 60,000 psi after rotation for 3 to 10 seconds to effect the bond. Thereafter, the cutting element and steel member were tempered at 375° for one hour. The cutting elements so formed when tested were found to provide strength under shear and bending loads comparable to that for inserts with an interference press fit in bores in a roller cutter body. Satisfactory bonds have also been made using inertial-type friction welding apparatus, for which only the initial special and axial forces are controlled. In addition, it is contemplated that other metals may be utilized for the roller cutter body and other composite materials, such as graded tungsten carbide with an iron, nickel binder, may be utilized for the cutting elements in which case the optimal friction weld process parameters may be different from the above-described parameters.

The roller cutter 11 and the method of manufacture of this invention provides several significant advantages over the conventional insert type roller cutter and its method of manufacture. More particularly, surface welding of the cutting elements 21 to the roller cutter body 15 without relatively deep holes being drilled in the roller cutter body, results in more space being available in the roller cutter body which can be utilized for the bearing assembly, thereby enabling it be made larger and with greater load carrying capacity than that of conventional insert type roller cutters. In addition, the absence of holes in the roller cutter body enables larger cutting elements which protrude further from the roller cutter body, as well as closer cutting element spacing to be utilized in the roller cutter 11 than in conventional insert type roller cutters. Further, because lower internal stresses are developed in the manufacture of the roller cutter 11 than in the manufacture of the conventional insert type roller cutter, and the roller cutter body 15 may be made thicker, a wider range of materials may be used for the roller cutter body 15. Moreover, the manufacturing method of this invention requires fewer machining operations, can be more readily automated and may be subject to closer operational control than the method of manufacturing conventional insert type roller cutters for lower manufacturing costs and improved quality.

Figure 6:
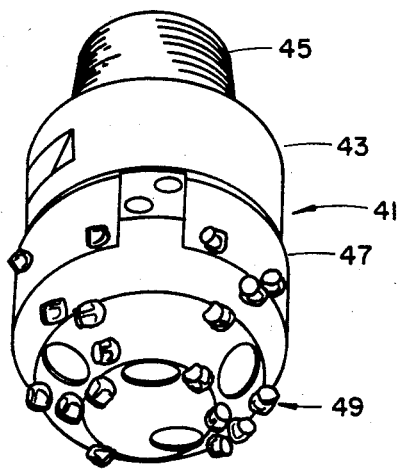
FIG. 6 is a perspective of a drag type drill bit of this invention having cutting elements secured to the lower face thereof by welding.
Figure 7:
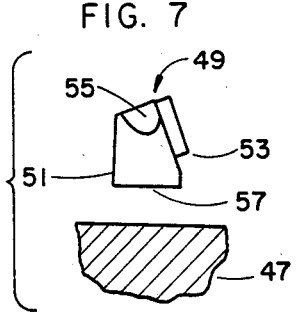
FIG. 7 is an enlarged exploded partial section of FIG. 6 showing one of the cutting elements and the steel member of the drill bit body to which it is to be secured.

Referring to FIGS. 6 and 7, a drag type rotary drill bit 41 of this invention is shown to comprise an upper drill bit body member 43 having a threaded pin 45 at its upper end and a lower drill bit body member or cutter head 47 of steel detachably secured to the upper member. The lower body member has a plurality of cutting elements 49 secured thereto primarily by thermal bonding (e.g., welding), and being substantially free of mechanical interconnection to the body member. Each cutting element comprises an enlongate member or stud 51 and a so-called compact 53 such as that described in U.S. Pat. No. 4,381,825 and commercially available under the trade designation STRATAPAX from the General Electric Company of Worthington, Ohio, secured to the side of the stud at an end thereof. The stud 51 is formed of the above-described composite material of the cutting elements 21 and in a manner similar to the above-described manner for the cutting element 21. The stud thus has composite material at the tip portion 55 thereof having a greater volume fraction of the first phase than of the second phase and having relatively high compressive strength and good wear resistance properties. However, this material also has a coefficient of thermal expansion significantly different from that of the steel cutting head 47 and thus is incapable of being welded thereto. At its base portion 57, the stud has composite material having a greater volume fraction of the second phase than of the first phase and thus a coefficient of thermal expansion similar to that of the steel cutter head. Intermediate the base and tip portions of the stud, the first and second phases vary in a generally continuous composition gradient along the length of the stud. The studs 51 are welded to the steel cutter head 47 in a method similar to the above-described method for the cutting elements 21.

While the roller cutter of the invention has been described above as having cutting elements secured to the roller cutter body by friction welding, it is also contemplated that they could be secured to the roller cutter body by other known thermal bonding methods, such as fusion welding and diffusion bonding. It should be noted that the term friction welding as used throughout this application is a generic term covering not only welding via the use of hydraulic or other mechanical drive means, but also so-called inertial welding involving the use of a flywheel. Lastly, while the cutting elements are disclosed as being of one-piece construction formed by sintering a powder metallurgy composite material, it is contemplated that during assembly the cutting element could comprise a series of discrete layers or members which are then fused or otherwised secured together. In addition, the cutting elements utilized in the above-described method may be formed of a steel member having a hard metal overlay at one end thereof.

In view of the above, it will be seen that several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:
1. In a roller cutter for a rotary drill bit having a generally conical roller cutter body formed of metal;
   a plurality of improved separate individual cutting elements secured to the outer surface of the roller cutter body primarily by welding and being substantially free of mechanical interconnection to the roller cutter body, each cutting element being an elongate member having a base portion at one end thereof engageable with the roller cutter body and a tip portion at its other end engageable with the formation to be drilled;
   each improved cutting element comprising a metallurgical composite of at least two varying phases with the composite having a substantially continuous mechanical gradient through at least said tip portion, at least one of said phases being a refractory compound and at least another of the phases being a binder metal or alloy;

said tip portion having a greater volume of said one phase than said another phase to provide a relatively high compressive strength but having a coefficient of thermal expansion and elastic moduli significantly different from that of the metal of the roller cutter body to render it incapable of being satisfactorily welded to the roller cutter body;

said base portion having a greater volume of said another phase than said one phase to provide a coefficient of thermal expansion and elastic moduli similar to those of the metal of the roller cutter body thereby permitting it to be easily welded to the roller cutter body.

2. A roller cutter as set forth in claim 1 wherein the refractory compound is a metal carbide and the binder metal is an alloy of iron, cobalt, nickel or copper.

3. A roller cutter as set forth in claim 1 wherein the cutting element has a generally continuous composition gradient along its length.

4. A roller cutter as set forth in claim 1 wherein the roller cutter body has generally outwardly projecting lands on its outer surface, said cutting elements being welded at their base portions to said lands, with one cutting element on each land.

5. A roller cutter as set forth in claim 4 wherein the side of each cutting element is generally flush with the side of its respective land.

6. A roller cutter as set forth in claim 1 wherein the base portions of said cutting elements are received in relatively shallow recesses in the roller cutter body.

7. A roller cutter as set forth in claim 6 wherein the base portions of said cutting elements are of generally convex shape as viewed on a longitudinal central section of the cutting element and the respective recesses are of corresponding concave shape.

8. A roller cutter as set forth in claim 1 wherein said welding is a friction welding operation, and a portion of each cutting element is of non-circular shape in transverse section so as to be engageable by means for rotating the cutting element.

9. A roller cutter as set forth in claim 8 wherein the non-circular portion of the cutting element is adjacent said base portion.

10. In a drag type rotary drill bit having a body member formed of metal at the lower end of the drill bit;

a plurality of improved cutting elements secured to the outer surface of the body member primarily by welding and being substantially free of mechanical interconnection to the body member, each cutting element being an elongate member having a base portion at one end thereof engageable with the body member and a tip portion at its other end engageable with the formation to be drilled;

each improved cutting element comprising a metallurgical composite of at least two varying phases with the composite having a substantially continuous mechanical gradient through at least said tip portion, at least one of said phases being a refractory compound and at least another of the phases being a binder metal or alloy;

said tip portion having a greater volume of said one phase than said another phase to provide a relatively high compressive strength but having a coefficient of thermal expansion and elastic moduli significantly different from that of the metal of the roller cutter body to render it incapable of being satisfactorily welded to the roller cutter body;

said base portion having a greater volume of said another phase than said one phase to provide a coefficient of thermal expansion and elastic moduli similar to those of the metal of the roller cutter body thereby permitting it to be easily welded to the roller cutter body.

* * * * *